(12) United States Patent
Yenney et al.

(10) Patent No.: US 7,831,216 B1
(45) Date of Patent: Nov. 9, 2010

(54) MOBILE-STATION-ASSISTED LOW-COST-INTERNET-BASE-STATION-(LCIB) LOCATION DETERMINATION

(75) Inventors: Christopher M. Yenney, Ashburn, VA (US); William H. Deal, Stone Ridge, VA (US); Bryan T. Barbee, Olathe, KS (US); Timothy W. Sill, Platte City, MO (US); Keith E. Moll, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 309 days.

(21) Appl. No.: 11/945,964

(22) Filed: Nov. 27, 2007

(51) Int. Cl.
H04B 1/40 (2006.01)

(52) U.S. Cl. ............................................. 455/88

(58) Field of Classification Search ............... 342/357, 342/357.09; 455/88
See application file for complete search history.

(56) References Cited

U.S. PATENT DOCUMENTS

| | | | |
|---|---|---|---|
| 3,710,335 A | 1/1973 | Lepley | |
| 5,528,247 A | 6/1996 | Nonami | |
| 5,736,962 A | 4/1998 | Tendler | |
| 6,233,448 B1 * | 5/2001 | Alperovich et al. | 455/417 |
| 6,608,592 B2 | 8/2003 | McReynolds | |
| 6,963,749 B2 | 11/2005 | Hayashida | |
| 6,993,345 B2 | 1/2006 | Ogino et al. | |
| 7,221,928 B2 | 5/2007 | Laird et al. | |
| 7,272,121 B2 | 9/2007 | Wilkes et al. | |
| 7,283,091 B1 | 10/2007 | Loomis | |
| 7,577,443 B1 | 8/2009 | Moll et al. | |
| 7,595,752 B2 | 9/2009 | van Diggelen et al. | |
| 2004/0204097 A1 | 10/2004 | Scheinert et al. | |
| 2006/0072537 A1 | 4/2006 | Lee et al. | |
| 2006/0291427 A1 | 12/2006 | Park | |
| 2007/0135140 A1 | 6/2007 | Tervo | |
| 2008/0119160 A1 | 5/2008 | Andriantsiferana et al. | |
| 2008/0244148 A1 * | 10/2008 | Nix et al. | 710/313 |
| 2008/0299992 A1 | 12/2008 | Eitan et al. | |

OTHER PUBLICATIONS

Office Action from U.S. Appl. No. 11/960,987, mailed Dec. 11, 2008.
Notice of Allowance from U.S. Appl. No. 11/960,987, mailed May 14, 2009.
Non-Final Office Action from U.S. Appl. No. 11/954,072, mailed Oct. 14, 2009.
Unpublished U.S. Appl. No. 11/954,072, filed Dec. 11, 2007 in the name of Talley et al.
Unpublished U.S. Appl. No. 11/960,987, filed Dec. 20, 2007 in the name of Moll et al.
Amundson, "Dead Reckoning for Consumer Electronics," 2006 Honeywell International.
Final Office Action from U.S. Appl. No. 11/954,072, mailed Apr. 2, 2010.

* cited by examiner

*Primary Examiner*—Thomas H Tarcza
*Assistant Examiner*—Harry Liu

(57) ABSTRACT

Methods and systems are provided for implementing mobile-station-assisted low-cost-Internet-base-station—(LCIB) location determination. In an embodiment, an LCIB receives location information over an air interface from a mobile station, the location information reflecting a location of the mobile station. In response to receiving the location information, the LCIB uses the location information to determine its location.

21 Claims, 5 Drawing Sheets

MOBILE-STATION-ASSISTED LOW-COST-INTERNET-BASE-STATION-(LCIB) LOCATION DETERMINATION

BACKGROUND

1. Cellular Wireless Networks

Many people use mobile stations, such as cell phones and personal digital assistants (PDAs), to communicate with cellular wireless networks. These mobile stations and networks typically communicate with each other over a radio frequency (RF) air interface according to a wireless protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." Another protocol that may be used is known as Evolution Data Optimized (EV-DO), perhaps in conformance with one or more industry specifications such as IS-856, Release 0 and IS-856, Revision A. Other protocols may be used as well, such as Global System for Mobile Communications (GSM), Time Division Multiple Access (TDMA), WiMax, and/or any others.

These networks typically provide services such as voice, Short Message Service (SMS) messaging, and packet-data communication, among others, and typically include a plurality of base stations, each of which provide one or more coverage areas, such as cells and sectors. When a mobile station is positioned in one of these coverage areas, it can communicate over the air interface with the base station, and in turn over one or more circuit-switched and/or packet-switched signaling and/or transport networks to which the base station provides access.

The base stations for these networks are typically not associated with any subscriber or small group of subscribers in particular; rather, they are placed in publicly-accessible locations and are used by the service provider's customers generally. These base stations collectively blanket cities, rural areas, etc. with coverage; as such, they are referred to generally and herein as "macro (or macro-network) base stations" and the network they collectively form—or to which they collectively belong—is referred to generally and herein as the "macro network."

Mobile stations and macro base stations conduct communication sessions (e.g. voice calls and data sessions) over frequencies known as carriers, each of which may actually be a pair of frequencies, with the base station transmitting to the mobile station on one of the frequencies, and the mobile station transmitting to the base station on the other. This is known as frequency division duplex (FDD). The base-station-to-mobile-station link is known as the forward link, while the mobile-station-to-base-station link is known as the reverse link.

Furthermore, using a sector as an example of a coverage area, macro base stations may provide service in a given sector on one carrier, or on more than one. An instance of a particular carrier in a particular sector is referred to herein as a sector/carrier. In a typical CDMA system, using a configuration known as radio configuration 3 (RC3), a macro base station can, on a given sector/carrier, transmit forward-link data on a maximum of 64 distinct channels at any time, each corresponding to a unique 64-bit code known as a Walsh code. Of these channels, typically, 61 of them are available as traffic channels (for user data), while the other 3 are reserved for administrative channels known as the pilot, paging, and sync channels.

When a macro base station instructs a mobile station—that is on a given sector/carrier—to use a particular traffic channel for a communication session, the macro base station does so by instructing the mobile station to tune to one of the 61 traffic channels on that sector/carrier. It is over that assigned traffic channel that the macro base station will transmit forward-link data to the mobile station during the ensuing communication session. And, in addition to that forward-link channel, the traffic channel also includes a corresponding Walsh-coded reverse-link channel, over which the mobile station transmits data to the macro base station.

2. Low-Cost Internet Base Stations (LCIBs)

Many macro-network subscribers, including private consumers and small businesses, among others, in addition to having wireless service (which may include data service) for their mobile station (or mobile stations), also have high-speed (a.k.a. "broadband") Internet access through another communication channel, which may be cable-modem service, digital-subscriber-line (DSL) service, satellite-based Internet service, and/or some other option.

In an exemplary arrangement, a user may have a cable modem connected (a) via coaxial cable to a cable provider's network and (b) via Ethernet cable to a wireless (e.g. IEEE 802.11 (WiFi)) router. That router may include one or more Ethernet ports to which computers or other devices may be connected, and may also include wireless-access-point functionality, providing a WiFi packet-data interface to, as examples, laptop computers, digital video recorders (DVRs), appliances, and/or any other computing devices or their wireless network adapters.

To address gaps in macro-network coverage (e.g. in buildings) and for other reasons, macro-network service providers have recently begun offering consumers devices referred to herein as Low-Cost Internet Base Stations (LCIBs), which may also be referred to as femtocells (femto base stations, femto base transceiver stations (BTSs)), picocells (pico base stations, pico BTSs), microcells (micro base stations, micro BTSs), and by other names. Note that the aforementioned terms that end in "cell" may also be generally and herein used interchangeably to refer to the coverage area provided by the respective device. Note also that "low-cost" is not used herein as a limiting term; that is, devices of any cost may be categorized as LCIBs, though most LCIBs typically will be less expensive on average than most macro-network base stations.

A typical LCIB may be approximately the size of a desktop phone or WiFi access point, and is essentially a low-power, low-capacity version of a macro base station. Thus, a typical LCIB will use a normal power outlet, perhaps with a transformer providing a DC power supply. The LCIB may have a wired (e.g. Ethernet) or wireless (e.g. WiFi) connection with the user's router, and would thus have connectivity to the Internet and/or one or more other packet-data networks via the user's broadband connection. An LCIB may establish a virtual-private-network (VPN) connection over the Internet with an entity (e.g. a VPN terminator) on the wireless-service (macro-network) provider's core network, and thereby be able to securely communicate with the VPN terminator and other entities on that core network and beyond.

The LCIB also has a wireless-communication (e.g. CDMA) interface that is compatible with the user's mobile station(s), such that the LCIB may act as a micro base station, providing coverage on the wireless-service provider's network via the user's Internet connection. Usually, an LCIB will provide service on a single RF carrier (or on a single carrier per technology, where multiple technologies (i.e. CDMA, EV-DO) are supported), and also transmit what is known as a pilot beacon, which includes administrative messages and parameters that mobile stations can use to connect with the LCIB. And LCIBs typically include a Global Positioning System (GPS) receiver for use in receiving and decoding GPS signals, for use in determination of location, as well as for use in synchronizing operations with other LCIBs and with the macro network, based on timing information embedded in GPS signals. Typically, LCIBs have fairly comprehensive auto-configuration capabilities, such that they are largely "plug-and-play" to the user.

BRIEF DESCRIPTION OF THE DRAWINGS

Various exemplary embodiments are described herein with reference to the following drawings, wherein like numerals denote like entities.

DETAILED DESCRIPTION OF THE DRAWINGS

1. Overview

Figure 1A:
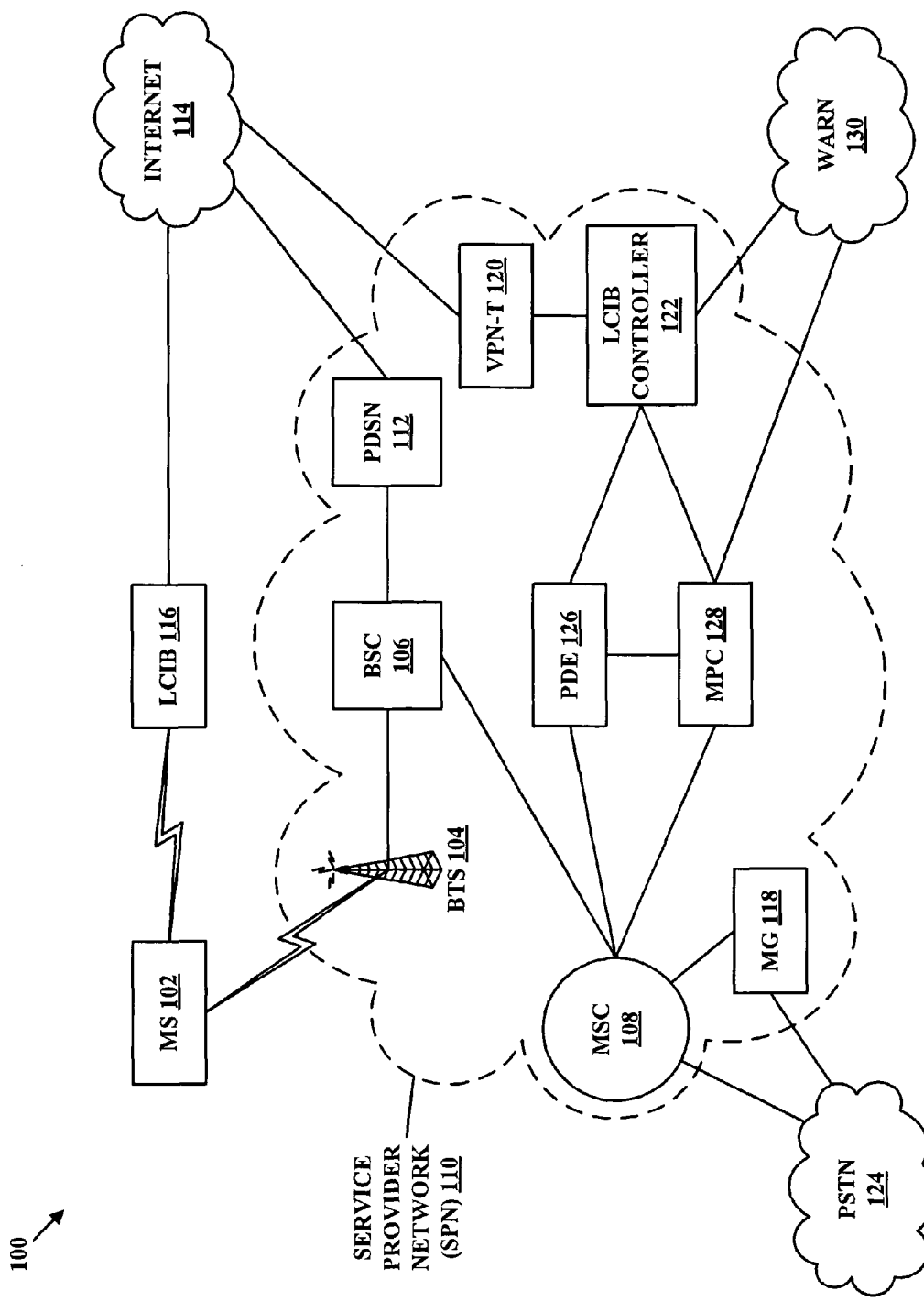
FIG. 1A is a simplified block diagram of a communication system, in accordance with exemplary embodiments.

As stated, an LCIB typically has an internal GPS receiver that it uses to receive GPS signals, for location and timing (i.e. synchronization), perhaps among other purposes. Upon being powered on or restarted, or in response to some other command or triggering event, an LCIB may use its GPS receiver to attempt to obtain an initial GPS fix, which typically involves receiving signals from multiple (e.g. three or four) satellites. The LCIB may then use those signals to compute its location. The LCIB may instead do so with the assistance of a network entity referred to here as a position determining entity (PDE). That is, the LCIB may use its Internet connection to send the data that it receives from the multiple GPS satellites to the PDE, which may then do the necessary calculations, and return a location (e.g. {latitude, longitude}) to the LCIB. The PDE may, instead of or in addition to sending the LCIB's location to the LCIB, store that location on the network, either on the PDE itself or on another entity.

In the example where the LCIB computes and stores—or receives and stores—its own location, the LCIB (or, in another example, one or more entities acting on behalf of the LCIB) may then use that location to acquire and/or confirm one or more operating parameters, such as a traffic-bearing carrier frequency (i.e. a carrier), a pseudorandom number (PN) offset, and/or any others. In one example, the LCIB may send a request for configuration information to a network entity, such as an LCIB controller, where the request includes the LCIB's location, perhaps among other values. The LCIB controller may then use that location to identify which carriers are licensed by the service provider in the location in which the LCIB resides.

The LCIB controller may then choose a licensed carrier, a PN offset, and/or any other configuration parameters, and send a configuration response to the LCIB over the Internet (i.e. over the VPN connection between a VPN terminator and the LCIB). Thereafter, the LCIB may operate using the operating parameters specified by the LCIB controller. This configuration response may also include additional information, such as an identification of nearby macro-network sectors, what carriers and PN offsets they use, etc. And in addition to formulating a request for auto-configuration information, the LCIB and/or network may also use the identified location for E911 purposes, and/or for any other suitable purpose(s).

And while the LCIB has a continuing need for receiving GPS signals, the need during general operation (i.e. after initial configuration) is not as stringent as it is during the time when the LCIB is attempting to acquire the initial GPS fix. In other words, it is generally easier to maintain a GPS lock than to acquire one. More particularly, after the initial fix, it may well be sufficient for the LCIB to receive a GPS signal from only one satellite. The LCIB would use this signal to keep its timing synchronized with that of the macro network. For any later calculation or re-calculation of location, however, the LCIB typically would need to be receiving signals from at least three GPS satellites.

The above-described auto-configuration process depends for its viability on the LCIB being able to acquire an initial GPS fix. It is often the case, however, that an LCIB will be deployed in a location that does not get sufficient GPS reception for this to happen. As one common example, an LCIB may be deployed in the basement of a home, perhaps in order to make up for inadequate or non-existent macro-network coverage in the home, or perhaps because the homeowner wishes to take advantage of an unlimited usage plan via the LCIB, or perhaps for some other reason, or some combination of the foregoing. And the basement may be the only deployment option that is possible and/or acceptable to the homeowner, for a variety of reasons. And as is typically the case, GPS reception is very poor in the user's basement.

Further to this example, the homeowner and/or others living there collectively have one or more mobile stations that they intend to use in conjunction with the LCIB. In accordance with the invention, the LCIB, upon determining that it needs an initial GPS fix, will query an associated mobile station for location information. Thus, the associated mobile station may, at the time of the query, be situated just outside the home, perhaps in the backyard or out by the mailbox. The mobile station could also be on a main or upper floor of the home, perhaps on a kitchen table or near a window. In any event, the mobile station is in a place where it is able to (a) receive—using its own GPS receiver—GPS signals that are sufficient for an initial fix and (b) communicate with the LCIB over a CDMA air interface.

Thus, the LCIB may send a location request via the CDMA air interface to the associated mobile station. Upon receipt of that location request, the mobile station may formulate a location response, and then send the location response to the LCIB. This location response could include an actual location (e.g. {latitude, longitude}), or it could just as well include the data that the mobile station is receiving from the GPS satellites, for further processing by the LCIB and/or PDE in accordance with the above description. Thus, in accordance with an embodiment of the present invention, the mobile station acts as an intelligent GPS antenna for the LCIB.

Furthermore, while one embodiment involves a real-time request/reply exchange between the LCIB and the associated mobile station (i.e. when the mobile station is situated such that it simultaneously has sufficient GPS signal quality as well as wireless CDMA connectivity with the LCIB), this is not required under the present invention. In particular, in another embodiment, the mobile station may have recently had a GPS fix, but currently does not have a good GPS signal. In this embodiment, the mobile station is still within range of the LCIB, such that the LCIB and the mobile station can communicate with each other over the CDMA air interface. In this embodiment, the mobile station may send the LCIB its last-known GPS location and/or data (i.e. last-known GPS location information).

A number of possibilities exist in this scenario. For example, the LCIB may, prior to accepting the location information from the mobile station, check how recent that information is. Instead or in addition, the mobile station may verify how current the location information is. If the information (perhaps based on a timestamp) is recent enough (perhaps within the previous minute, five minutes, 10 minutes, etc.), the LCIB may consider this acceptable. If not, the LCIB may reject this information as stale.

In another embodiment, the GPS-equipped mobile station may include dead-reckoning hardware (e.g. pedometer, accelerometer, compass, pressure sensor (barometric altimeter), etc.), in which case the mobile station may use that dead-reckoning hardware, along with dead-reckoning techniques known in the art, to update the last-known GPS location with direction and distance traveled since that last-known GPS location was stored, and then transmit the updated location to the LCIB. In another embodiment, the dead-reckoning hardware and techniques may be used only to ensure that the mobile station had traveled less than a threshold distance since the last GPS fix, similar to the elapsed-time safeguard.

In some embodiments, mobile stations associated with the LCIB may provide location information to the LCIB via the CDMA air interface only in response to receiving a location query from the LCIB. In other embodiments, a mobile station may detect the LCIB and/or determine that it has registered or otherwise associated with the LCIB, and responsively automatically send location information to the LCIB, which the LCIB could use if needed or wanted, but that the LCIB could also just disregard if the LCIB does not need the information.

With respect to the registration/association aspect between the LCIB and the mobile station, it may be the case that some LCIBs are designed such that registration in its conventional sense (i.e. the process by which mobile stations become able to place and receive calls via a base station (such as an LCIB) with which they register) may not be possible or permitted until after the LCIB's auto-configuration sequence has completed, which would mean after the LCIB has successfully ascertained its location and then used that location to further configure itself as described herein. As such, LCIBs arranged to carry out embodiments of the present invention may, as part of their configuration process, "listen" for any mobile stations from which location information may be requested. The LCIB may also or instead be arranged to offer a sort of provisional registration, according to which mobile stations would be able to associate themselves with the LCIB for purposes of providing location, but would not yet be able to place and receive calls via the LCIB, which would not yet have an approved carrier. And other possibilities exist as well, without departing from the invention.

In some embodiments, a mobile station may receive a request for location information from an LCIB, and then determine that it does not have adequate GPS reception at the moment. Once the mobile station later detects that it has GPS coverage, it may then respond to the LCIB's request. In one embodiment, the mobile station may display a message to its user, asking the user to go outside (or to a window, etc.) for a few minutes in order to acquire a GPS fix for its associated LCIB. This could be limited to mobile stations on the LCIB's list of authorized, home, preferred, etc. mobile stations. Once the LCIB received the location information from the mobile station, it could send the mobile station an acknowledgement, which the mobile station could use to indicate success to the user and/or remove the message. And other possibilities exist as well, without departing from the invention.

Moreover, in some embodiments, a mobile station may be configured to not rely solely on its own internal GPS receiver for the raw or calculated location information that the mobile station sends to the LCIB via the CDMA air interface. In particular, the mobile station may be in a location where it has macro-network coverage, and may engage in a location-determination session with one or more macro-network entities. Thus, the mobile station may, as a result of this session, receive its location from the macro network via one or more macro base stations. The mobile station may then—or once it is within the coverage area of the LCIB, as described above—transmit that location via the CDMA air interface to the LCIB. And other possibilities exist as well, without departing from the invention.

Thus, in accordance with exemplary embodiments of the present invention, an LCIB that is deployed in a location that results in the LCIB having insufficient GPS reception for acquiring an initial GPS fix can acquire the necessary location information by querying an associated mobile station, somewhat analogous to a macro-network base station querying a mobile station for the mobile station's location, so that the macro network can have accurate records as to mobile-station locations. The present invention obviates cumbersome, unsightly, and potentially ineffective external GPS antennas mounted on the LCIB. The present invention also obviates detailed location-data entry by an inconvenienced and/or inexperienced user of the LCIB, which could lead to data-reliability and customer-dissatisfaction problems, among other problems.

2. Exemplary Architecture a. An Exemplary Communication System

FIG. 1A is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1A, a communication system 100 includes a mobile station (MS) 102, a macro BTS 104, a base station controller (BSC) 106, a mobile switching center (MSC) 108, a service provider network (SPN) 110, a packet data serving node (PDSN) 112, the Internet 114, an LCIB 116, a media gateway 118, a VPN terminator (VPN-T) 120, an LCIB controller 122, a public switched telephone network (PSTN) 124, a positioning determining entity (PDE) 126, a mobile positioning center (MPC) 128, and a wide-area reference network (WARN) 130. And additional entities could be present, such as additional mobile stations in communication with BTS 104, additional entities in communication with Internet 114 and/or PSTN 124, etc. Also, there could be one or more devices and/or networks making up at least part of one or more communication links. For example, there could be one or more routers, cable modems, and/or other devices or networks on the link between LCIB 116 and Internet 114.

Mobile station 102 may be any mobile device arranged to carry out the mobile-station functions described herein. As such, mobile station 102 may include a user interface, a wireless-communication interface, a location interface such as a GPS-enabled chipset, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may include an antenna and a chipset suitable for communicating with one or more macro base stations and/or one or more LCIBs over suitable air interfaces. For example, the chipset could be suitable for CDMA communication. The chipset or wireless-communication interface in general may also be able to communicate with other types of networks and devices, such as EV-DO networks, Wi-Fi networks, Bluetooth devices, and/or one or more additional types of networks and devices. The wireless-communication interface may also include the GPS-enabled chipset and/or other location module(s). The GPS-enabled chipset, processor, and data storage may be any suitable components known to those in the art. As examples, mobile station 102 could be or include a cell phone, a PDA, a computer, a laptop computer, a hybrid CDMA/EV-DO device, and/or a multi-mode cellular/Wi-Fi device.

Macro BTS 104 may be any network element arranged to carry out the macro-BTS functions described herein. As such, macro BTS 104 may include a communication interface, a processor, and data storage comprising instructions executable by the processor to carry out those macro-BTS functions. The communication interface may include one or more antennas, chipsets, and/or other components for providing one or more CDMA coverage areas such as cells and sectors, for communicating with mobile stations such as mobile station 102 over an air interface. The communication interface may also include one or more wired (e.g. Ethernet) and/or wireless (e.g. WiFi) interfaces for communicating with at least BSC 106.

BSC 106 may be any network element arranged to carry out the BSC functions described herein. As such, BSC 106 may include a communication interface, a processor, and data storage comprising instructions executable by the processor to carry out those BSC functions. The communication interface may include one or more wired and/or wireless interfaces for communicating with at least macro BTS 104, MSC 108, and PDSN 112. In general, BSC 106 functions to control one or more macro BTSs such as macro BTS 104, and to provide those one or more macro BTSs with connections to devices on service provider network 110.

Note that the combination of macro BTS 104 and BSC 106 may be considered a macro base station. However, macro BTS 104 or BSC 106 could, taken alone, be considered a macro base station as well. Furthermore, a macro base station may be considered to be either or both of those devices, and perhaps make use of one or more functions provided by MSC 108, PDSN 112, and/or any other entity, without departing from the invention. And it should be noted that the macro network and/or the LCIB(s) described herein may operate according to CDMA, EV-DO, iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), Bluetooth, infrared, and/or any other wireless technology or technologies now known or later developed.

MSC 108 may be any networking element arranged to carry out the MSC functions described herein. Thus, MSC 108 may include a communication interface, a processor, and data storage comprising instructions executable by the processor to carry out those MSC functions. The communication interface may include one or more wired and/or wireless interfaces for communicating with at least BSC 106, media gateway 118, PSTN 124, PDE 126, and MPC 128. In general, MSC 108 acts as a switch between PSTN 124 and BSCs such as BSC 106, and may also act as a switch between PSTN 124 and MG 118—in general, facilitating communication between SPN 110 and PSTN 124, which may be the public switched telephone network.

Service-provider network 110 may encompass all of the network elements depicted in FIG. 1A as being included in its dashed-cloud shape. In general, there may be more and/or different communication links among entities within service-provider network 110, and there may be more and/or different connections between service-provider network 110 and outside entities. Furthermore, there may be a core packet network (not depicted) making up part of service-provider network 110, which may enable devices therein to communicate with each other. There may also be one or more other packet-data networks and/or elements, one or more circuit-switched networks and/or elements, one or more signaling networks and/or elements, and/or one or more of any other suitable network(s) and/or element(s).

PDSN 112 may be any networking element arranged to carry out the PDSN functions described herein. As such, PDSN 112 may include a communication interface, a processor, and data storage comprising instructions executable by the processor for carrying out those PDSN functions. The communication interface may include one or more wired and/or wireless interfaces for communicating with at least BSC 106 and Internet 114. In general, PDSN 112 acts as a network access server between Internet 114 and BSCs such as BSC 106, facilitating packet-data communication between mobile stations and Internet 114, via macro base stations.

Internet 114 may be the well-known global packet-data network generally referred to as the Internet. However, Internet 114 may also be or include one or more other packet-data networks, without departing from the scope and spirit of the present invention. As such, Internet 114 may include one or more wide area networks, one or more local area networks, one or more public networks, one or more private networks, one or more wired networks, one or more wireless networks, and/or one or more networks of any other type. Devices in communication with Internet 114 may exchange data using a packet-switched protocol such as the Internet Protocol (IP), and may be identified by an address such as an IP address.

LCIB 116 may be any computing and communication device arranged to carry out the LCIB functions described herein. As such, LCIB 116 may include a communication interface, a processor, and data storage comprising instructions executable by the processor for carrying out those LCIB functions. The communication interface may include a wireless interface for communicating with one or more mobile stations according to a protocol such as CDMA (and/or one or more other technologies), as well as an Ethernet or WiFi interface for communicating with a device such as a router and/or a cable modem. LCIB 116 may also have a GPS receiver and/or other location module. LCIB 116 is also described in connection with FIG. 2.

Media gateway (MG) 118 may be any networking element arranged to carry out the MG functions described herein. As such, MG 118 may include a communication interface, a processor, and data storage comprising instructions executable by the processor for carrying out those media-gateway functions. The communication interface may include both a circuit-switched interface and a packet-switched interface. MG 118 may (a) receive packet-based communications from SPN 110, convert those to circuit-switched communications, and pass them to PSTN 124 (or MSC 108) and (b) receive circuit-switched communications from PSTN 124 (or MSC 108), convert those to packet-based communications, and pass them to SPN 110.

VPN terminator 120 may be any networking element arranged to carry out the VPN-terminator functions described herein. Thus, VPN terminator 120 may include a communication interface, a processor, and data storage comprising instructions executable by the processor for carrying out those VPN-terminator functions. The communication interface may include one or more wired and/or wireless interfaces for communicating with at least LCIB controller 122 and Internet 114. In general, VPN terminator 120 functions to establish secure VPN connections over Internet 114 with LCIBs such as LCIB 116, enabling the LCIBs to securely communicate with devices on SPN 110, such as LCIB controller 122, and perhaps beyond.

LCIB controller 122 may be any networking element arranged to carry out the LCIB-controller functions described herein. Thus, LCIB controller 122 may include a communication interface, a processor, and data storage comprising instructions executable by the processor for carrying out those LCIB-controller functions. The communication interface may include one or more wired and/or wireless interfaces for communicating with at least VPN terminator 120, PDE 126 and/or MPC 128, WARN 130, as well as perhaps one or more other entities on SPN 110 and beyond. Among other functions, LCIB controller 122 communicates via VPN terminator 120 with LCIBs such as LCIB 116. LCIB controller 122 may receive requests from various LCIBs for configuration data, and those requests may include, among other values, indications of the LCIBs' respective locations. LCIB controller 122 may also be operable to select various operational parameters for LCIBs (e.g. carrier, PN offset, whether to broadcast a pilot-beacon, contents of any pilot beacon to be broadcast, transmission-power level), and to transmit those parameters to LCIBs, perhaps along with other configuration data and messaging.

PDE 126 may be any networking element arranged to carry out the PDE functions described herein. Thus, PDE 126 may include a communication interface, a processor, and data storage comprising instructions executable by the processor for carrying out those PDE functions. The communication interface may include one or more wired and/or wireless interfaces for communicating with at least MSC 108, LCIB controller 122, MPC 128, along with perhaps one or more other entities on SPN 110 and beyond.

In general, PDE 126, among possibly other functions may receive requests from mobile stations, LCIBs, etc. for assistance with determining location. These requests may include data received by the requesting entity from one or more GPS satellites. PDE 126 may use this data to compute a location, and return that location to the requesting entity, perhaps in addition to storing that location on PDE 126, MPC 128, LCIB controller 122, and/or on one or more other network entities. PDE 126 may also assist devices such as mobile stations and LCIBs in computing their own location, by providing GPS assistance data to those devices.

MPC 128 may be any networking element arranged to carry out the MPC functions described herein. Thus, MPC 128 may include a communication interface, a processor, and data storage comprising instructions executable by the processor for carrying out those MPC functions. The communication interface may include one or more wired and/or wireless interfaces for communicating with at least MSC 108, LCIB controller 122, PDE 126, WARN 130, along with perhaps one or more other entities on SPN 110 and beyond. In general, MPC 128 may function to store current locations of mobile stations (perhaps received from PDE 126), and to respond to requests for particular mobile stations' locations from, for example, MSC 108. MPC 128 may be arranged to receive location information, such as LCIB-location information, from LCIB controller 122, and then store that information.

WARN 130 may be any one or any combination of devices, network entities, networks, etc. collectively arranged to collect GPS information from terrestrial base stations that are communicating with GPS satellites, and to pass that information to one or more network entities (e.g. PDE 126, MPC 128, LCIB controller 122) described herein, for the purposes of enabling those network entities to pass some or all of that information to various devices (e.g. mobile stations and/or LCIBs), to help those devices determine their location. As such, WARN 130 may be connected via a suitable communication path with MPC 128, PDE 126, and/or LCIB controller 122, among other possibilities.

b. An Exemplary Scenario

Figure 1B:
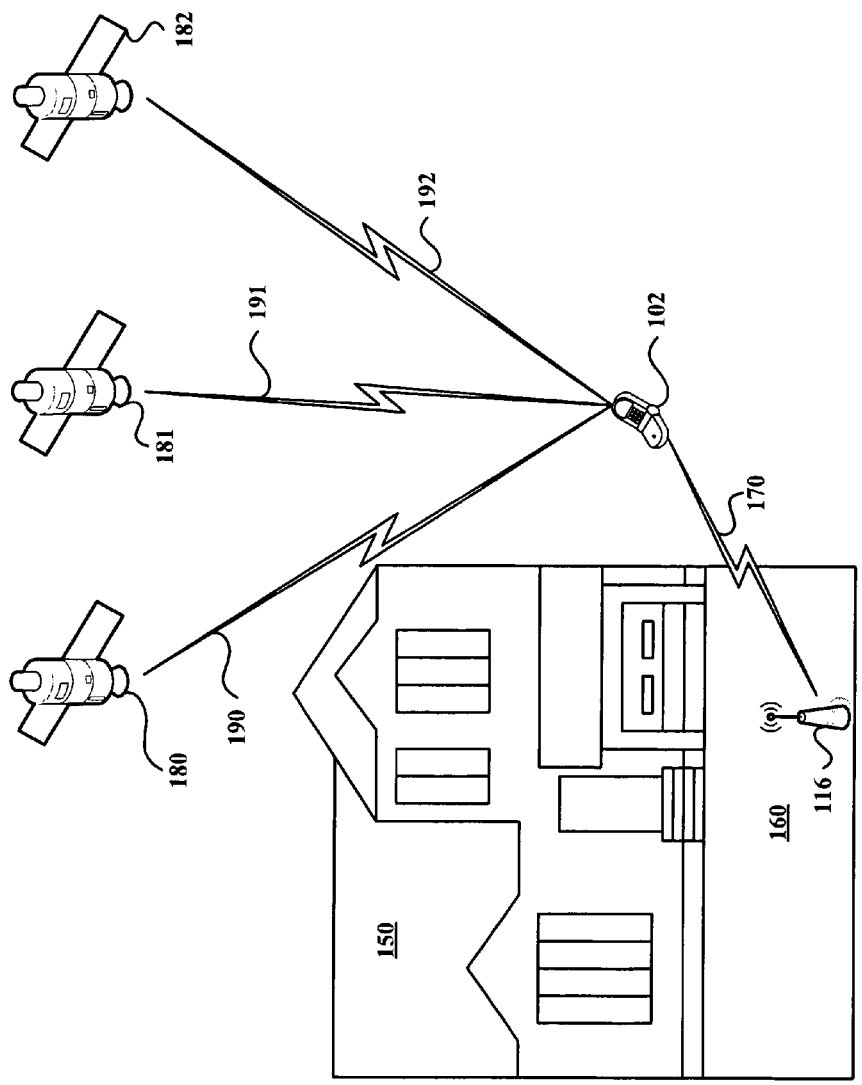
FIG. 1B is a simplified block diagram of an arrangement of communication entities, in accordance with exemplary embodiments.

FIG. 1B depicts an exemplary arrangement of communication elements, in which embodiments of the present invention may be carried out. Note that the arrangement shown in FIG. 1B is by way of example and not by way of limitation: additional and/or different elements could be present in a given scenario, without departing from the invention.

FIG. 1B depicts a house 150 having a basement 160 in which LCIB 116 has been deployed. Mobile station 102 and LCIB 116 communicate over a CDMA air interface 170, though any other wireless technology could be used. Mobile station 102 is shown as being situated outside house 150, within sight (i.e. line of sight) of GPS satellites 180-182. Mobile station 102 receives a GPS signal 190 from satellite 180, a GPS signal 191 from satellite 181, and a GPS signal 192 from satellite 182. Note that mobile station 102 could receive signals from a different number of GPS satellites, and that three is provided by way of example.

In the scenario depicted in FIG. 1B, it could well be the case that LCIB 116 can only faintly detect a signal from one of the GPS satellites 180-182, which would be deployed in orbit. Mobile station 102, however, when situated outside house 150 (or on the main floor, top floor, near a window, etc.), can receive signals from enough GPS satellites to obtain a good GPS fix using its internal GPS receiver. In some embodiments, mobile station 102 may communicate via a macro base station (not shown) with PDE 126 (not shown) for aid in determining its location.

c. An Exemplary LCIB

Figure 2:
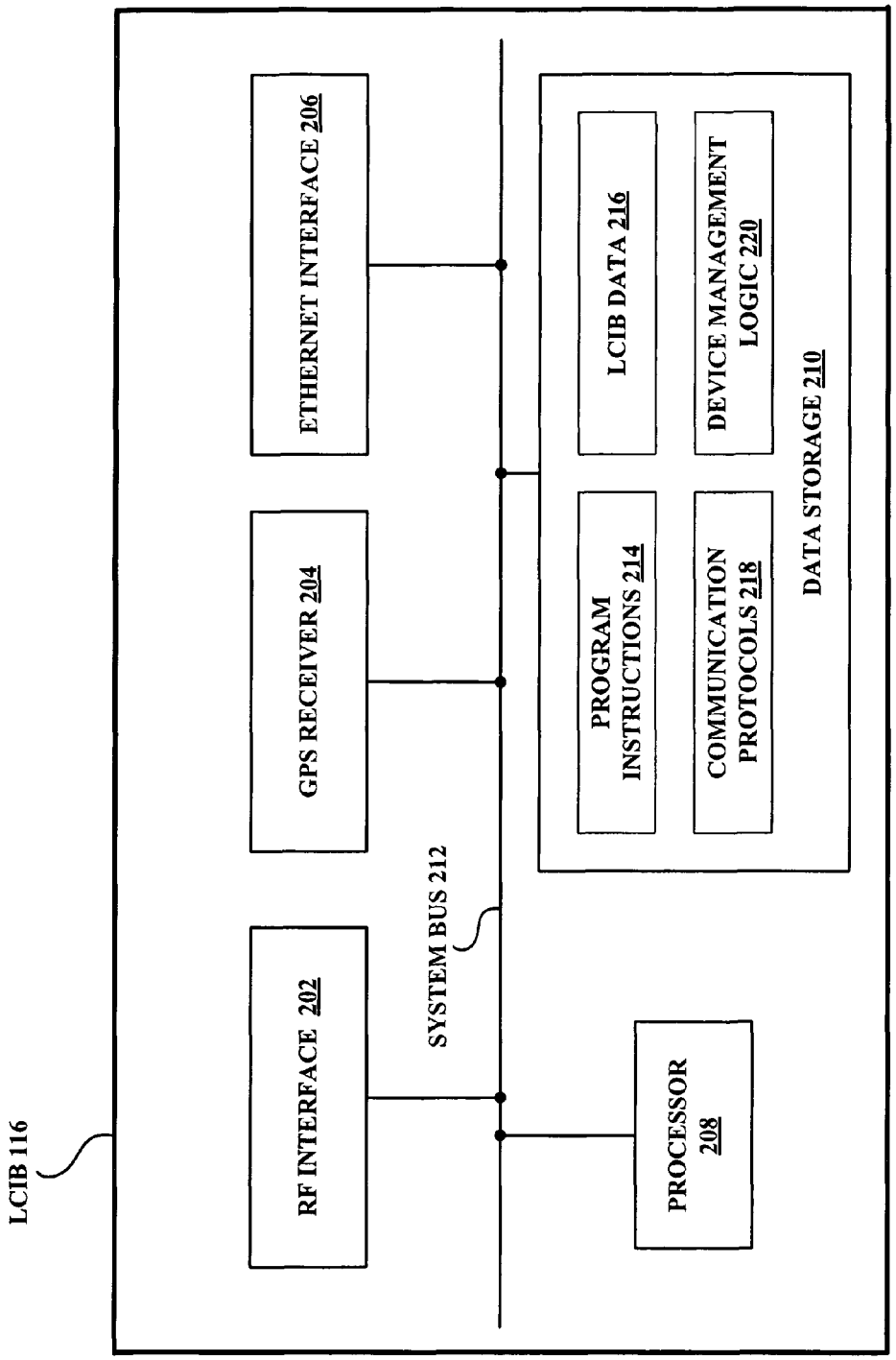
FIG. 2 is a simplified block diagram of an LCIB, in accordance with exemplary embodiments.

FIG. 2 depicts an exemplary diagram of LCIB 116, which includes an RF interface 202, a GPS receiver 204, an Ethernet interface 206, a processor 208, and data storage 210, all communicatively linked by a system bus 212. Note that LCIB 116 could have additional and/or different components, and that this structure is provided by way of example.

RF interface 202 may include one or more antennas, one or more chipsets, a set of one or more channel elements, and/or one or more other components suitable for providing a wireless coverage area according to a wireless-communication protocol such as CDMA (and/or one or more other technologies). GPS receiver 204 may be any known or hereafter-developed GPS receiver, suitable for receiving and decoding GPS signals for location and timing purposes, perhaps among other purposes. In some embodiments, an LCIB may have a location module in addition to or instead of a GPS receiver.

Ethernet interface 206 may provide a wired packet-data interface for communicating with a device such as a router or cable modem. Processor 208 may comprise multiple (e.g., parallel) processors, such as a general purpose microprocessor and/or a discrete digital signal processor. The data storage 210 may take various forms, in one or more parts, such as a non-volatile storage block and/or a removable storage medium, and may include (a) program instructions 214 executable by processor 208 for carrying out the LCIB functions described herein, (b) LCIB data 216, which may be any operational data or other type of data stored for use by LCIB 116, (c) communication protocols 218, facilitating and enabling communication with one or more other devices, and (d) device management logic 220, perhaps for memory and file management.

3. Exemplary Operation a. A First Exemplary Method

Figure 3:
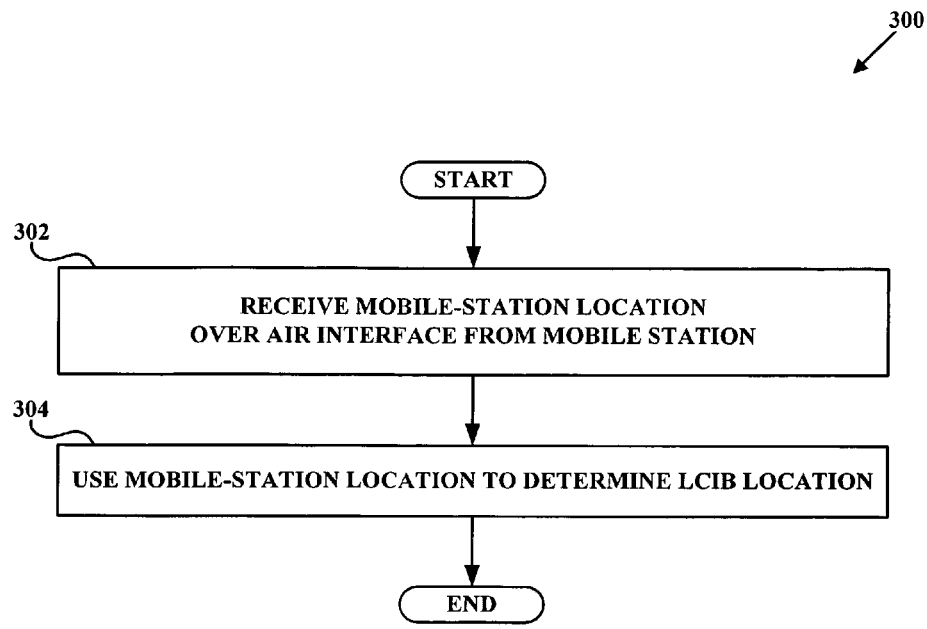
FIG. 3 is a flowchart of a method, in accordance with exemplary embodiments.

FIG. 3 depicts a flowchart of an exemplary method, in accordance with an exemplary embodiment. In particular, FIG. 3 depicts a method 300 carried out by LCIB 116. As shown in FIG. 3, method 300 begins at step 302, when an LCIB (e.g. LCIB 116) receives location information over an air interface (e.g. air interface 170) from a mobile station (e.g. mobile station 102), where the location information reflects a location of the mobile station. At step 304, in response to receiving the location information, LCIB 116 uses the location information to determine its own location.

These steps are further explained in the following subsections. And it should be noted that, although method 300 is described as being carried out by LCIB 116, this is not required. In some embodiments, method 300 may be carried out by LCIB 116 in cooperation with one or more other network entities, such as VPN terminator 120, LCIB controller 122, PDE 126, MPC 128, and/or any others. In general, method 300 could be carried out by any one or any combination of the network elements described herein, or any other network element(s).

i. Receive Mobile-Station Location from Mobile Station Over Air Interface

At step 302, LCIB 116 receives location information over air interface 170 from mobile station 102, where the location information reflects the location of mobile station 102. In one embodiment, LCIB 116 sends a query for the location information to mobile station 102 over air interface 170. In that embodiment, LCIB 116 receiving the location information over air interface 170 from mobile station 102 involves LCIB 116 receiving a reply to the query, the reply including the location information. LCIB 116 may send the query upon determining that it is not receiving a sufficient GPS signal to acquire an initial GPS fix.

Mobile station 102 may receive the query from LCIB 116 over air interface 170, and responsively check whether it (i.e. mobile station 102) has a sufficient GPS signal for producing the location information. If mobile station 102 determines that it does not have a sufficient GPS signal to produce the location information, mobile station 102 may cache the query. Later on, mobile station 102 may determine that it then has a sufficient GPS signal for producing the location information, and responsively (a) produce the location information and (b) send the location information to the LCIB over the air interface. Producing the location information may be as simple as storing the data it receives from GPS satellites, though it may also involve computing a location based on that data, perhaps with the help of PDE 126 and/or MPC 128.

In another embodiment, mobile station 102 may not need to be queried by LCIB 116 in order to provide location information thereto. As such, mobile station 102 may determine that it has detected LCIB 116, is registered with LCIB 116, and/or is associated with LCIB 116, and responsively send the location information to LCIB 116 over air interface 170.

In one or more embodiments, the location information that LCIB 116 receives over air interface 170 (which may be a CDMA air interface, among many possibilities) may take the form of one or more of the following types of data: a latitude, a longitude, a street address, a city, a state, a zip code, a country, a GPS pseudorandom code, GPS ephemeris data, and GPS almanac data. GPS signals typically include each of the last three types of data. The GPS pseudorandom code generally identifies a particular GPS satellite. The ephemeris data indicates where each satellite should be at any time during the day—each GPS satellite typically transmits data about the orbital paths of itself and all of the other GPS satellites with which it is associated. The almanac data includes a current timestamp (i.e. date and time).

In some embodiments, the location of the mobile station that is reflected in the location information transmitted from mobile station 102 to LCIB 116 is the current location of mobile station 102. That is, mobile station 102 may act as essentially a real-time antenna for LCIB 116, sending LCIB 116 GPS data that the mobile station 102 is currently receiving or has just received. In certain of these current-location embodiments, mobile station 102 may use dead-reckoning hardware and software to update its last-known location (such as a location at the time of the last GPS fix) with direction and/or distance traveled from that last-known location.

That is, mobile station 102 may produce the location information (e.g. a {latitude, longitude}) that it sends to LCIB 116 by using its last-known GPS waypoint (location) as a starting point, and then updating that location using a compass, accelerometer-based pedometer, and/or any other dead-reckoning sensors and algorithms known in the art. And LCIB 116 may receive an indication from mobile station 102 as to how far mobile station 102 has traveled since its last GPS fix. LCIB 116 may only accept mobile station 102's location result—and in fact mobile station 102 may only send the location information—if that distance-traveled indication is less than some threshold distance. And other examples are possible.

In other embodiments, the location information that mobile station 102 provides to LCIB 116 via air interface 170 may reflect the last-known location of mobile station 102. For example, if mobile station 102 acquires a GPS fix and then enters house 150, mobile station may still have that last GPS location stored, but may no longer be receiving a GPS signal that is sufficient to determine a current location. It may be that last-known location that mobile station 102 provides to LCIB 116 over air interface 170.

And mobile station 102 may also have stored a timestamp that indicates when that last GPS location was stored. In that case, either or both of mobile station 102 and LCIB 116 may test that timestamp against a current time. And mobile station 102 may only send the location information to LCIB 116—and likewise or instead, LCIB 116 may only accept that location information as a basis for determining its own location—if the difference between the current time and the timestamp is less than some threshold amount of time. In another embodiment, LCIB 116 may have no ability to determine a current time (e.g. it may need a GPS signal to set its clock); in that case, mobile station 102 could provide LCIB 116 with both the current time and the timestamp of mobile station 102's last-known location, or perhaps with a number of seconds (or more generally an amount of time) between the current time and the timestamp. And many other examples are possible as well, without departing from the invention.

As stated herein, in some embodiments, mobile station 102 may seek the aid of the macro network in producing the location information to send via air interface 170 to LCIB 116. In particular, mobile station 102 may engage in a location-determination session with at least one macro-network entity, such as PDE 126 and/or MPC 128 as examples, so as to produce the location information. In one example, PDE 126 may receive GPS data from mobile station 102, compute a location from that data, and return the location to mobile station 102. Instead, PDE 126 may send GPS assistance data to mobile station 102, which mobile station 102 may then use in conjunction with the information it receives from GPS satellites—and may in fact use to "locate" the satellites in the first place—to compute its location.

And mobile station 102 and/or a macro-network entity such as PDE 126 or MPC 128 may also factor in terrestrial signal strengths from various macro base stations that mobile station 102 is detecting, to arrive at a location result. And other location-determination processes and algorithms may be used instead or in addition, without departing from the invention.

ii. Use Mobile-Station Location to Determine LCIB Location

At step 304, in response to receiving the location information, LCIB 116 uses the location information to determine its own location. This may be as simple as receiving a location (e.g. {latitude, longitude}, street address, etc.) from mobile station 102 that reflects mobile station 102's location, and then setting the location of LCIB 116 equal to that received value. This may reflect reality in many circumstances, such as when mobile station 102 is vertically above LCIB 116 (i.e. on a higher floor, but clearly at the same {latitude, longitude}).

Note that, in this example as in any others, LCIB 116 may store its own location and/or publish that location to a network entity such as PDE 126, MPC 128, LCIB controller 122, or some other server. In some embodiments, the location information received by LCIB 116 from mobile station 102 may be or include GPS data (pseudorandom code, ephemeris, almanac, etc.) received from multiple GPS satellites; as such, step 304 may involve LCIB 116 using that information to compute its own location, perhaps with the assistance of one or more network entities such as PDE 126 and/or MPC 128, with which LCIB 116 may communicate via its backhaul connection (e.g. over a VPN connection between LCIB 116 and VPN terminator 120).

For example, LCIB 116 may query PDE 126 or MPC 128 using the location information received from mobile station 102, and receive LCIB 116's location in reply. And other examples are possible, such as PDE 126 or MPC 128 sending GPS assistance data to LCIB 116 over the VPN. In any event, once LCIB 116 has its location, it may—perhaps in addition to other uses for the location information—then use the location to request configuration data (carrier, PN offset, neighbor list, etc.) from an entity such as LCIB controller 122, and become operational.

b. A Second Exemplary Method

Figure 4:
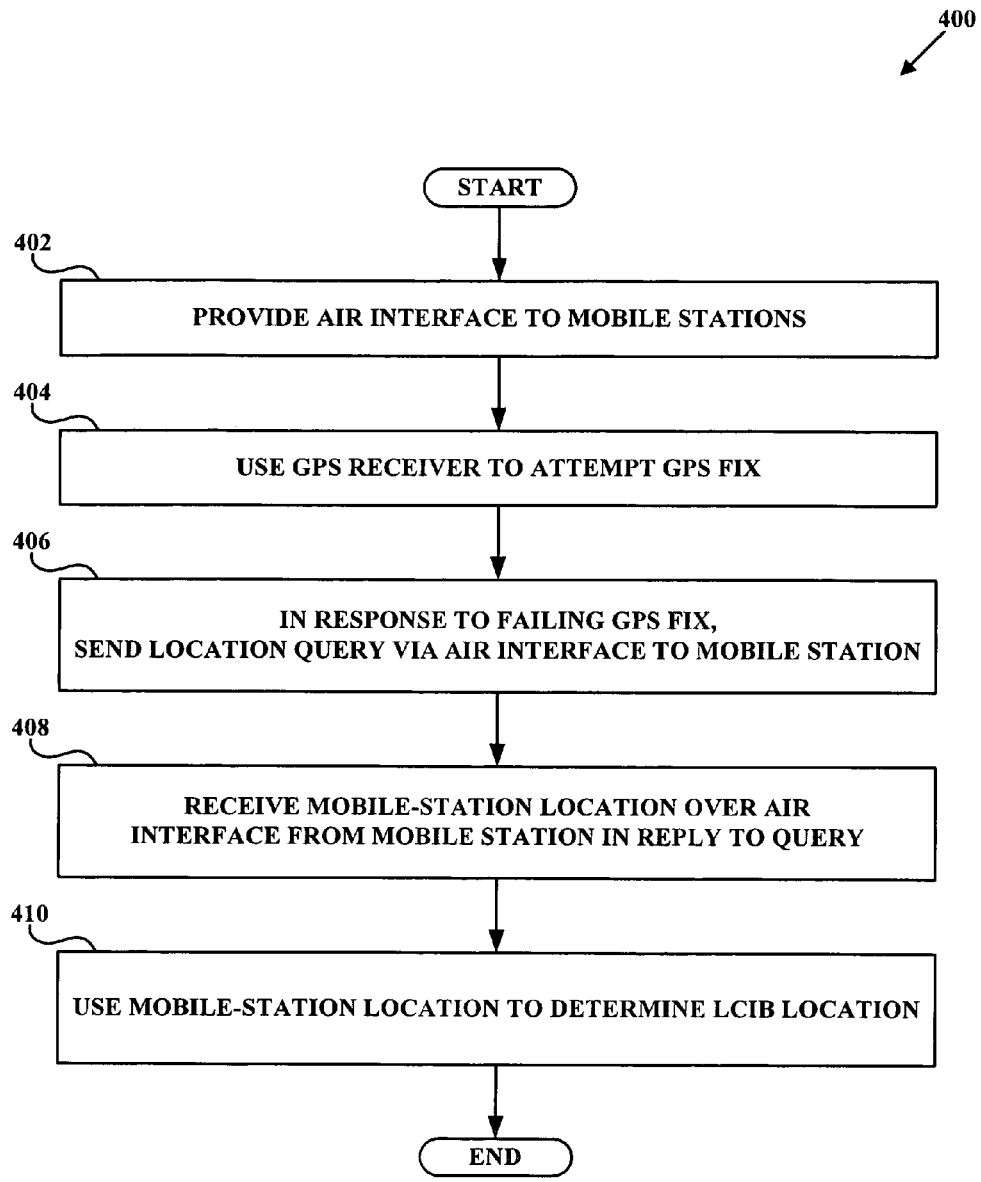
FIG. 4 is a flowchart of a method, in accordance with exemplary embodiments.

FIG. 4 is a flowchart of a second exemplary method, in accordance with an exemplary embodiment. In particular, FIG. 4 depicts a method 400, which may be carried out by an LCIB such as LCIB 116, or perhaps by an LCIB in cooperation with one or more other entities such as VPN terminator 120, LCIB controller 122, PDE 126, MPC 128, and/or any other(s). Method 400 is similar in some respects to method 300, and thus is not described in as great of detail.

As shown in FIG. 4, method 400 begins at step 402, when LCIB 116 provides an air interface 170 (e.g. a CDMA air interface) to at least one mobile station such as mobile station 102. At step 404, LCIB 116 uses GPS receiver 204 to attempt to acquire a GPS fix. At step 406, in response to failing to acquire the GPS fix, LCIB 116 sends a location query via air interface 170 to mobile station 102, where the location query requests location information. At step 408, LCIB 116 receives a reply to the query from mobile station 102 over air interface 170, where the reply includes the requested location information, and where that location information reflects the (e.g. current, last-known, dead-reckoning-adjusted, etc.) location of mobile station 102. At step 410, in response to receiving the reply in step 408, LCIB 116 uses the location information to determine its own location, in any of the manners described herein, or in any other manner.

4. Conclusion

Various exemplary embodiments have been described above. Those skilled in the art will understand, however, that changes and modifications may be made to those examples without departing from the scope of the claims.

The invention claimed is:

1. A low-cost Internet base station (LCIB) comprising:
   a communication interface for providing an air interface to at least one mobile station;
   a location module comprising a Global Positioning System (GPS) receiver;
   a processor; and
   data storage comprising instructions executable by the processor to:
   use the GPS receiver to attempt to acquire a GPS fix;
   in response to failing to acquire the GPS fix, send a location query via the air interface to a mobile station, the location query requesting location information;
   receive a reply to the query from the mobile station over the air interface, the reply comprising the requested location information, the location information reflecting a location of the mobile station; and
   in response to receiving the reply, use the location information to determine a location of the LCIB.

2. The LCIB of claim 1, wherein the location information comprises at least one of a latitude, a longitude, a street address, a city, a state, a zip code, a country, a Global Positioning System (GPS) pseudorandom code, GPS ephemeris data, and GPS almanac data.

3. The LCIB of claim 1, wherein the location information comprises a distance-traveled indication, and wherein using the location information to determine the location of the LCIB comprises using the location information to determine the location of the LCIB only if the distance-traveled indication is less than a threshold distance.

4. The LCIB of claim 1, wherein the location of the mobile station is one of the current location of the mobile station and the last-known location of the mobile station.

5. The LCIB of claim 1, wherein the air interface operates according to at least one technology selected from the group consisting of CDMA, EV-DO, iDEN, TDMA, AMPS, GSM, GPRS, UMTS, EDGE, WiMAX, IEEE 802.16, LTE, microwave, satellite, MMDS, Wi-Fi, IEEE 802.11, Bluetooth, and infrared.

6. The LCIB of claim 1, wherein the instructions to use the location information to determine the location of the LCIB comprise instructions to set the location of the LCIB equal to the location information.

7. The LCIB of claim 1, wherein the location information comprises Global Positioning System (GPS) data received from multiple GPS satellites, and wherein the instructions to use the location information to determine the location of the LCIB comprise instructions to compute the location of the LCIB based on the GPS data.

8. The LCIB of claim 1, further comprising a backhaul connection to at least one of a position determining entity (PDE) and a mobile positioning center (MPC), wherein the instructions to use the location information to determine the location of the LCIB comprise instructions to query at least one of the PDE and the MPC over the backhaul connection using the location information, and to receive the location of the LCIB from at least one of the PDE and the MPC in reply.

9. The LCIB of claim 1, wherein the data storage further comprises instructions executable by the processor to use the determined location of the LCIB to obtain at least one operational parameter of the LCIB.

10. A method comprising:
providing an air interface to at least one mobile station;
using a Global Positioning System (GPS) receiver to attempt to acquire a GPS fix;
in response to failing to acquire the GPS fix, sending a location query via the air interface to a mobile station, the location query requesting location information;
receiving a reply to the query from the mobile station over the air interface, the reply comprising the requested location information, the location information reflecting a location of the mobile station; and
in response to receiving the reply, using the location information to determine a location of the LCIB.

11. The method of claim 10, further comprising:
the mobile station receiving the query and responsively checking whether the mobile station has a sufficient Global Positioning System (GPS) signal for producing the location information;
in response to determining that it does not have a sufficient GPS signal for producing the location information, the mobile station caching the query; and
after caching the query, the mobile station later determining that it has a sufficient GPS signal for producing the location information, and responsively (a) producing the location information and (b) sending the location information to the LCIB over the air interface.

12. The method of claim 10, further comprising the mobile station determining at least one of (a) that the mobile station has detected the LCIB over the air interface, (b) that the mobile station is registered with the LCIB, and (c) that the mobile station is associated with the LCIB, and responsively sending the location information to the LCIB over the air interface.

13. The method of claim 10, wherein the location information comprises at least one of a latitude, a longitude, a street address, a city, a state, a zip code, a country, a Global Positioning System (GPS) pseudorandom code, GPS ephemeris data, and GPS almanac data.

14. The method of claim 10, wherein the location of the mobile station is one of the current location of the mobile station and the last-known location of the mobile station.

15. The method of claim 10, further comprising:
the mobile station using dead reckoning to update a last-known location of the mobile station with at least one of direction and distance traveled from the last-known location of the mobile station, so as to produce the location information; and
the mobile station sending the location information to the LCIB over the air interface.

16. The method of claim 10, wherein the location information comprises a timestamp, and wherein using the location information to determine the location of the LCIB comprises using the location information to determine the location of the LCIB only if the timestamp indicates that the location information was stored less than a threshold amount of time before a current time.

17. The method of claim 10, further comprising:
the mobile station engaging in a location-determination session with at least one macro-network entity, so as to produce the location information; and
the mobile station sending the location information to the LCIB over the air interface.

18. The method of claim 10, wherein the air interface operates according to at least one technology selected from the group consisting of CDMA, EV-DO, iDEN, TDMA, AMPS, GSM, GPRS, UMTS, EDGE, WiMAX, IEEE 802.16, LTE, microwave, satellite, MMDS, Wi-Fi, IEEE 802.11, Bluetooth, and infrared.

19. The method of claim 10, wherein the location information comprises Global Positioning System (GPS) data received from multiple GPS satellites, and wherein using the location information to determine the location of the LCIB comprises computing the location of the LCIB based on the GPS data.

20. The method of claim 10, wherein using the location information to determine the location of the LCIB comprises querying at least one of a position determining entity (PDE) and a mobile positioning center (MPC) over a backhaul connection using the location information, and receiving the location of the LCIB from at least one of the PDE and the MPC in reply.

21. The method of claim 10, further comprising the LCIB using the determined location of the LCIB to obtain at least one operational parameter of the LCIB.

* * * * *